(12) United States Patent
Westlake

(10) Patent No.: US 6,878,878 B2
(45) Date of Patent: Apr. 12, 2005

(54) JUNCTION BOX COVER

(75) Inventor: Patrick C. Westlake, 465 Twp. Road 471, Hammondsville, OH (US) 43930

(73) Assignee: Patrick C. Westlake, Hammondsville, OH (US)

( * ) Notice: Subject to any disclaimer, the term of this patent is extended or adjusted under 35 U.S.C. 154(b) by 0 days.

(21) Appl. No.: 10/236,028

(22) Filed: Sep. 5, 2002

(65) Prior Publication Data

US 2003/0051894 A1 Mar. 20, 2003

Related U.S. Application Data

(63) Continuation-in-part of application No. 09/881,988, filed on Jun. 15, 2001, now abandoned.
(60) Provisional application No. 60/212,480, filed on Jun. 16, 2000.

(51) Int. Cl.[7] .................................................. H02G 3/14
(52) U.S. Cl. ............................ 174/66; 174/67; 220/241; 439/138; D8/353
(58) Field of Search ........................ 174/66, 67, 58, 174/50; 220/241, 242, 3.8, 3.92, 402; 439/135, 138; D13/177, 156; D8/353

(56) References Cited

U.S. PATENT DOCUMENTS

| | | | | |
|---|---|---|---|---|
| 3,634,598 A | * | 1/1972 | Stanfield | 174/51 |
| 4,032,030 A | * | 6/1977 | Bass et al. | 220/3.8 |
| 5,965,844 A | * | 10/1999 | Lippa | 174/49 |
| 6,274,809 B1 | * | 8/2001 | Pudims et al. | 174/48 |
| 6,278,062 B1 | * | 8/2001 | Sowdon | 220/241 X |
| 2003/0141092 A1 | * | 7/2003 | Petak et al. | 174/66 |

* cited by examiner

*Primary Examiner*—Dhiru R Patel
(74) *Attorney, Agent, or Firm*—Webb Ziesenheim Logsdon Orkin & Hanson, P.C.

(57) ABSTRACT

The present invention is a junction box cover for use in conjunction with a junction box. The junction box cover includes a plate element having a rim portion, an elevated portion, and a transition portion connecting the rim portion with the elevated portion. The plate element has at least one slot on the rim portion, which is configured to accept a fastening mechanism. In operation, the junction box cover is placed over an open side of the junction box, and the junction box cover is secured to the junction box via the fastening mechanism extending through the slot.

18 Claims, 2 Drawing Sheets

JUNCTION BOX COVER

CROSS REFERENCE TO RELATED APPLICATIONS

This application is a continuation-in-part of U.S. patent application Ser. No. 09/881,988, filed Jun. 15, 2001 now abandoned, which takes priority from U.S. Provisional Application Ser. No. 60/212,480, filed Jun. 16, 2000 is now abandoned.

BACKGROUND OF THE INVENTION

1. Field of the Invention

The present invention relates generally to electrical junction box devices, and, in particular, to an extension cover for junction boxes.

2. Description of the Prior Art

In the field of electrical wiring, junction boxes are used to house electrical wires at certain junctions throughout the electrical system. These junction boxes, typically a square, steel box structure, are designed and manufactured to conform with the National Electrical Code, ensuring uniformity throughout the United States. While these junction boxes are normally capable of housing the bunched wires within the confines of the box, in many installation instances, the box is not large enough to comfortably hold the wiring. In these cases, the electrician may force and squeeze the wiring into the box before attaching the front cover plate, increasing the chances of wire damage. In addition, with the recent increase in computer wiring installations, the box cannot securely hold the large bunches of wiring.

In order to alleviate this problem, junction box extensions have been developed. One variation of these extensions is shaped like a square box, however, unlike the junction box, the extension has no back plate. In use, an electrician will attach the extension to the front of the junction box, via screws, essentially doubling the area for the wires. After attaching the extension, the electrician will attach the front plate to the front of the extension, making one, large junction box. While this extended junction box has ample room for wiring, in most cases it has more room than is required. Yet another drawback is the need for both the extension as well as the front cover plate, forcing the electrician to carry both parts to each site. These extensions are costly to manufacture and are not easily "stackable" for storage and distribution.

In another variation of a typical extension, the front cover plate is formed with an elevated central portion, having four screw orifices on the corners of the extended front cover plate. These extensions are also costly to manufacture and are not easily "stackable" for storage and distribution. Additionally, in this variation, the screws must be wholly removed from the structure to allow cover removal and access to the wiring within the junction box.

The use of various covers is common in connection with switch boxes. A switch box is used to house electrical wiring, as well as the switch mechanism, in a box-like structure. For example, as seen in U.S. Pat. No. 3,634,598 to Stanfield, a weatherproof electrical enclosure is provided and has an elevated portion to house the switch mechanism. Similarly, U.S. Pat. No. 6,274,809 to Pudims et al. discloses an electrical floor box having four outlets around a central area. This floor box is a large capacity box for specialty applications. In addition, the device of the Pudims patent is an outlet box. Further, U.S. Pat. No. 5,965,844 to Lippa is directed to a mounting plate and cover for electrical boxes and again is used in specialty applications. Various portions of the device of the Lippa patent are used to hold switch mechanisms. Importantly, these switch and outlet boxes are constructed so as to house the appropriate mechanisms therein. Further, the National Electric Code prohibits the use of outlet boxes as junction boxes. Therefore, there remains a need for appropriate extensions to be used in connection with junction boxes that complies with the National Electric Code.

SUMMARY OF THE INVENTION

It is therefore an object of the present invention to provide a junction box cover that overcomes the deficiencies of the prior art. It is another object of the present invention to provide a junction box cover that acts as an integrated extension and front cover plate. It is another object of the present invention to provide a junction box cover that is inexpensive to manufacture and is also easy to stack. It is another object of the present invention to provide a junction box cover that provides ample space for excess wiring, yet allows the junction box to fit in all installation situations. It is a still further object of the present invention to provide a junction box cover that is simple in its installation and maintenance in the field.

The present invention is a junction box cover that includes a metallic plate element; the plate element having a rim portion, a transition portion and an elevated portion. Further, on at least one corner of the rim portion is a slot configured to accept a fastening mechanism.

In operation, after the electrician places the wires within the junction box, the junction box cover is placed over the open face of the junction box. As the box has screw orifices on opposite corners of the face of the box, the slot or slots are lined up with the junction box screw orifices. Once aligned, a fastening mechanism or mechanisms, such as screws, are inserted and fastened through the screw orifices and the slots, securing the junction box cover to the junction box. No additional structure is needed, as the elevated portion of the plate element fully covers the open face of the junction box. In addition, in certain of the preferred embodiments, providing slots, as opposed to orifices, on the corner or corners of the junction box cover allows for easy removal. The electrician may simply loosen the screws only enough so that the junction box cover can be slid off of the face of the junction box via the slots. Also, the "cupped" shape of the junction box cover serves to aid in stacking multiple junction box covers, the elevated portion of one junction box cover held immediately adjacent the elevated portion of a second junction box cover.

The present invention, both as to its construction and its method of operation, together with additional objects and advantages thereof, will best be understood from the following description of specific embodiments when read in connection with accompanying drawings.

DETAILED DESCRIPTION OF THE PREFERRED EMBODIMENT

Figure 1:
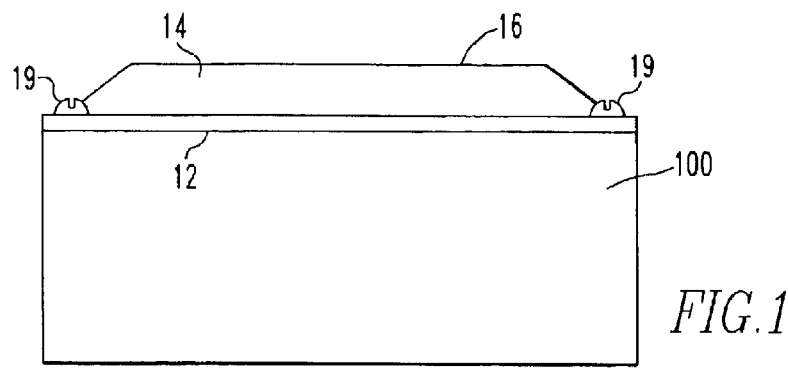
FIG. 1 is a side view of a first embodiment of a junction box cover according to the present invention as attached to a junction box.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Various numerical ranges are disclosed in this patent application. Because these ranges are continuous, they include every value between the minimum and maximum values. Unless expressly indicated otherwise, the various numerical ranges specified in this application are approximations.

Figure 2:
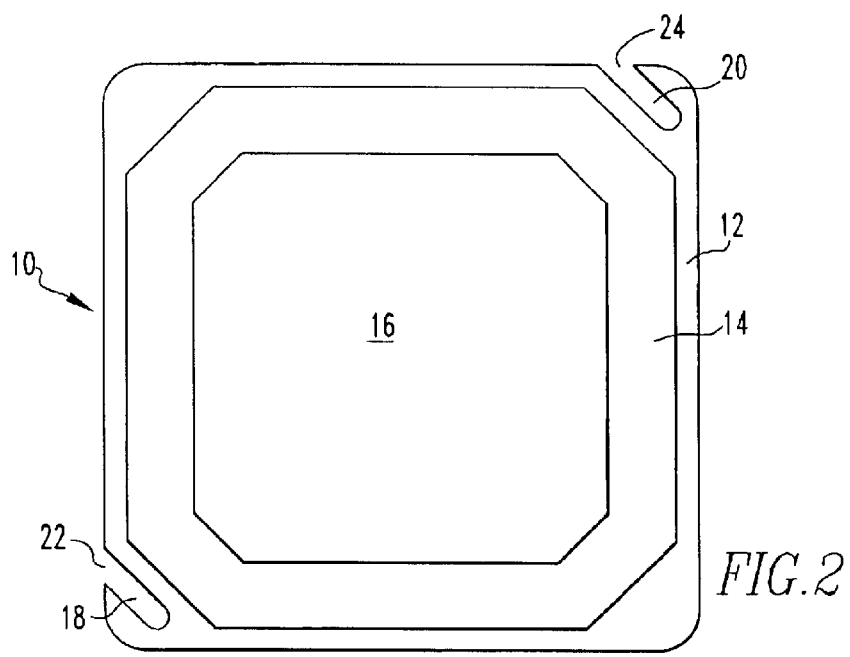
FIG. 2 is a top view of a first embodiment of the junction box cover of FIG. 1.
Figure 3:
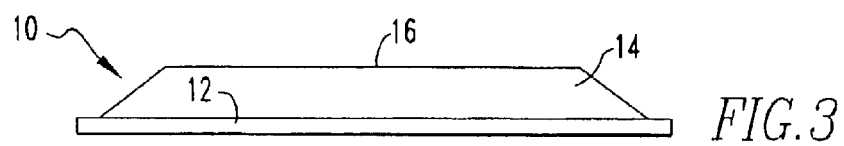
FIG. 3 is a side view of the embodiment in FIG. 1.

A first embodiment of the junction box cover 10 of the present invention is generally shown in FIGS. 1–3. The present invention junction box cover 10 is formed of metal and includes a plate element 11, having a rim portion 12, a transition portion 14 and an elevated portion 16. In a first embodiment of the present invention, on opposite corners of the plate element 11 are two slots 18 and 20. These slots 18 and 20 are configured to accept a fastening mechanism 19, typically a screw.

As shown in FIGS. 1–4, the junction box cover 10 may have a square-shaped plate element. As a typical junction box 100 has slightly rounded corners, the plate element 11 may likewise have rounded corners. The rim portion 12 of the plate element 11 is flat and runs around the periphery of the plate element 11. Immediately adjacent the rim portion 12 and on an inner periphery of the plate element 11 is a transition portion 14 which slopes upward and inward from the rim portion 12. When viewed from the top, the transition portion 14 is square-shaped with truncated corners. Immediately adjacent the transition portion 14 is an elevated portion 16.

Figure 5:
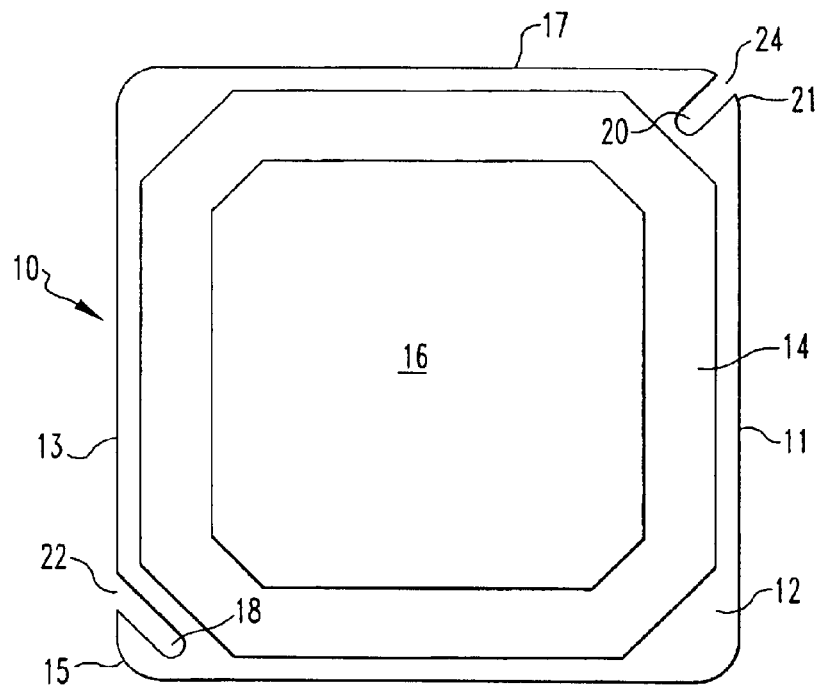
FIG. 5 is a top view of a second embodiment of a junction box cover according to the present invention.
Figure 6:
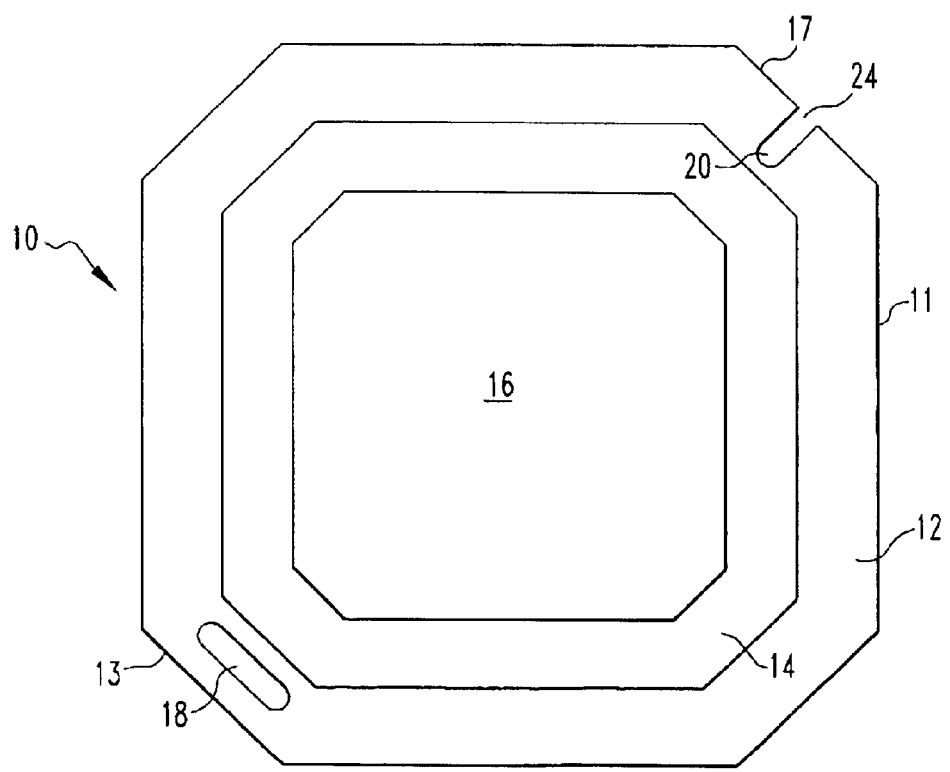
FIG. 6 is a top view of a third embodiment of a junction box cover according to the present invention.

When viewed from the top, the elevated portion 16, as with the transition portion 14, is square-shaped with truncated corners. In addition, the elevated portion 16 is a flat, planar area located centrally on the plate element 11. As seen in FIG. 2, when viewed from the aide, the junction box cover 10 creates an elevated, metallic structure with a flat rim portion 12, a sloped transition portion 14 and a flat elevated portion 16. As shown in FIG. 5, the junction box cover 10 may also have a octagonal-shaped plate element 11.

In this first embodiment, located on opposite corners of the rim portion 12 of the plate element 11 are two slots 18 and 20. These slots 18 and 20 are configured to accept the fastening mechanism 19, typically a screw. Slot 18 extends through a first edge 13 and into the rim portion 12 adjacent a first corner 15 of the plate element 11. Further, slot 18 extends in a angular orientation, typically 45°, with respect to the first edge 13 of the plate element 11. Slot 20 extends through a second edge 17 and into the rim portion 12 of the plate element 11. In the first embodiment, slot 20 extends through the second edge 17 and into the rim portion 12 of the plate element 11 in a angular orientation, typically parallel to the angular orientation of slot 18. In addition, the slots 18 and 20 are shaped so as to accept the fastening mechanism 19, such as screws, through the slots 18 and 20, yet still allow for slight variation in alignment of the slots 18 and 20 with junction box screw orifices. Slots 18 and 20 are formed with slot mouths 22 and 24, which allow an electrician to slide the slot mouths 22 and 24 around a screw 19 already partially threaded into the junction box 100 screw orifices.

In installation, an electrician makes a determination whether an extension is required. If so required, the junction box cover 10 is placed over an open face area on a junction box 100, acting as both an extension and a cover plate. The slots 18 and 20 of the junction box cover 10 are aligned with the junction box 100 screw orifices, and screws 19 are inserted through the slots 18 and 20 and threaded into the junction box 100 screw orifices. The junction box cover 10 is aligned with the junction box 100, and the screws 19 are tightened, securely fastening the junction box cover 10 to the junction box 100.

If the electrician must work on a junction box 100 already having a junction box cover 10 attached, he or she only need loosen the screws 19, as opposed to removing the screws 19. Once the screws 19 are loosened, the electrician may laterally move the junction box cover 10 from the junction box 100 via the slots 18 and 20. Once junction box cover 10 is removed, the electrician may work with the internal wiring, and, thereafter, easily slide the junction box cover 10 back onto the junction box 100 using the slot mouths 22 and 24. After the junction box cover 10 is realigned with the junction box 100, the screws 19 are again tightened, securing the junction box cover 10 to the junction box 100.

It is also envisioned that orifices may be inserted through the corners opposite the currently slotted corners of the plate element 11. Adding either one or two orifices on the alternate corners would allow the electrician to further secure the junction box cover 10 to the junction box 100 via additional screws 19.

Figure 4:
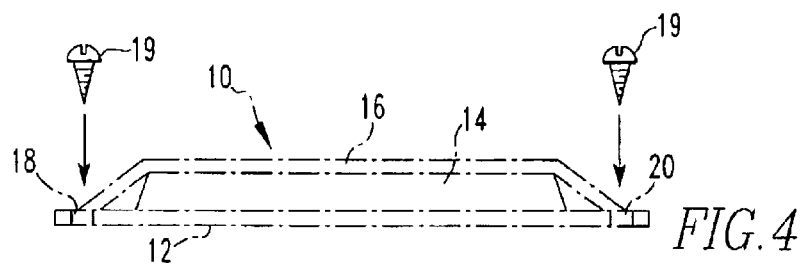
FIG. 4 is a side sectional view of the embodiment in FIG. 1.

In a second embodiment, shown in FIG. 4, the second slot 20 may extend through a second corner 21 of the plate element 11. In this embodiment, the slot 20 extends at an angle transverse to the angular orientation of the first slot 18.

In a third embodiment, shown in FIG. 5, the plate element 11 and the junction box 100 both have a octagonal shape. In this embodiment, the slot 18 extends through the rim portion 12 of the plate element 11 adjacent the first edge 13 of the plate element 11. Slot 18 extends at an angle parallel with the first edge 13. In this third embodiment, slot 20 extends through the second edge 17 and into the rim portion 12 of the plate element 11 at an angle transverse to the angular orientation of slot 18. As the plate element 11 has a octagonal shape, all of the rim portion 12, the transition portion 14 and the elevated portion 16 also have a octagonal shape. However, all three discussed embodiments are similar in that the elevated portion 16 lies on a different plane than the rim portion 12.

In its manufacture, the junction box cover 10 is typically formed from galvanized carbon steel or similar mild steel. In using plain galvanized steel, the junction box cover 10 is much cheaper in its manufacture than other available extensions, which require drawing quality galvanized steel. These more expensive steels are required in manufacturing other extensions due to the complicated structure formed in the stamping process. Further, the complicated structure of the other extensions results in high tooling costs and low production speed. Conversely, due to the shape of the present invention, the junction box cover 10 has low tooling costs, low steel costs and is able to be manufactured at a much higher rate than other extensions.

In addition, the junction box cover 10 of the present invention is easily stackable. As seen in FIGS. 1–5, the shape of the junction box cover 10 allows the transition portion 14/raised portion 16 area of one junction box cover 10 to be placed immediately adjacent to the transition portion 14/raised portion 16 of a second junction box cover 10. In this manner, an unlimited amount of junction box covers 10 may be stacked and easily transported with the electrician to and from the field. Also, as some prior art extensions require additional face cover plates, multiple pieces are required to be with the electrician for use. The junction box cover 10 of the present invention serves to both extend and cover the junction box 100. This adds to the convenience of the electrician, while decreasing installation time.

This invention has been described with reference to the preferred embodiments. Obvious modifications and alterations will occur to others upon reading and understanding the preceding detailed description. It is intended that the invention be construed as including all such modifications and alterations.

What is claimed is:

1. A junction box cover, comprising:
    a plate element having a rim portion, an octagonal elevated portion, and a transition portion connecting the rim portion with the octagonal elevated portion, wherein the octagonal elevated portion is continuously planar; and
    at least one slot on the rim portion of the plate element and configured to accept a fastening mechanism;
    wherein, in operation, the junction box cover is placed over an open side of a junction box, and the junction box cover is secured to the junction box via the fastening mechanism extending through the at least one slot.

2. The junction box cover of claim 1, wherein the plate element has a square shape, and the at least one slot extends through a first edge and into the rim portion adjacent a first corner of the plate element at a angular orientation, with respect to the first edge of the plate element.

3. The junction box cover of claim 2, wherein the angular orientation is 45°.

4. The junction box cover of claim 2, further comprising a second slot extending through a second edge and into the rim portion of the plate element and configured to accept a second fastening mechanism.

5. The junction box cover of claim 1, wherein the plate element has a square shape, the at least one slot extends through a first edge and into the rim portion adjacent a first corner of the plate element at a angular orientation, with respect to the first edge of the plate element, and the second slot extends through a second edge and into the rim portion of the plate element.

6. The junction box cover of claim 5, wherein the second slot extends through the second edge and into the rim portion adjacent a second corner of the plate element at a angular orientation, with respect to the second edge of the plate element.

7. The junction box cover of claim 6, wherein the angular orientation of the second slot is parallel to the angular orientation of the first slot.

8. The junction box cover of claim 5, wherein the second slot extends through a second corner of the plate element at an angle transverse to the angular orientation of the first slot.

9. The junction box cover of claim 1, wherein the plate element has a octagonal shape.

10. The junction box cover of claim 9, wherein the at least one slot extends through the rim portion of the plate element adjacent a first edge of the plate element.

11. The junction box cover of claim 10, wherein the at least one slot extends at an angle parallel to the angle of the first edge of the plate element.

12. The junction box cover of claim 9, further comprising a second slot extending through a second edge and into the rim portion of the plate element and configured to accept a second fastening mechanism.

13. The junction box cover of claim 12, wherein the second slot extends through a second corner of the plate element at an angle transverse to the angular orientation of the first slot.

14. The junction box cover of claim 1, wherein the octagonal elevated portion of the plate element lies on a different plane than the rim portion of the plate element.

15. The junction box cover of claim 1, wherein the fastening mechanism is a screw.

16. The junction box cover of claim 1, wherein the plate element is formed of a galvanized carbon steel.

17. A junction box cover, comprising:
    a square-shaped plate element having a rim portion, an octagonal elevated portion, and a transition portion connecting the rim portion with the octagonal elevated portion, wherein the octagonal elevated portion is continuously planar;
    a first slot on the rim portion of the plate element and configured to accept a first fastening mechanism;
    a second slot extending through an edge and into the rim portion of the plate element and configured to accept a second fastening mechanism;
    wherein the octagonal elevated portion of the plate element lies on a different plane than the rim portion of the plate element; and
    wherein, in operation, the junction box cover is placed over an open aide of a junction box, and the junction box cover is secured to the junction box via the first fastening mechanism extending through the first slot and via the second fastening mechanism extending through the second slot.

18. A junction box cover, comprising:
    an octagonal-shaped plate element having a rim portion, an octagonal elevated portion, and a transition portion connecting the rim portion with the octagonal elevated portion, wherein the octagonal elevated portion is continuously planar;
    a first slot extending through the rim portion of the plate element adjacent a first edge of the plate element and configured to accept a first fastening mechanism;
    a second slot extending through a second edge and into the rim portion of the plate element and configured to accept a second fastening mechanism;
    wherein the octagonal elevated portion of the plate element lies on a different plane than the rim portion of the plate element; and
    wherein, in operation, the junction box cover is placed over an open side of a junction box, and the junction box cover is secured to the junction box via the first fastening mechanism extending through the first slot and via the second fastening mechanism extending through the second slot.

* * * * *